Feb. 20, 1923.

E. G. HULSE.
RESILIENT TIRE.
FILED DEC. 22, 1922.

1,445,768.

INVENTOR
EDISON G. HULSE
BY:- *H. H. Waters*
ATTORNEY

Patented Feb. 20, 1923.

1,445,768

UNITED STATES PATENT OFFICE.

EDISON G. HULSE, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

RESILIENT TIRE.

Application filed December 22, 1922. Serial No. 608,452.

*To all whom it may concern:*

Be it known that I, EDISON G. HULSE, a citizen of the United States, residing at Cumberland, in the county of Allegany and State of Maryland, have invented certain new and useful Improvements in Resilient Tires, of which the following is a specification.

My present invention has for its object a specific improvement in the design of that type of heavy-duty, nonpneumatic tire, principally used on motor trucks and mainly dependent for resiliency upon the presence of stress-relieving voids in the structure into which the displaced material within the zone of traction will flow.

The novel improvements herein recited are particularly directed to the further perfection of the type of tire shown generally, in Letters Patent No. 1,427,331 of August 29, 1922; the same representing a widely advertised and universally used tire known as the "caterpillar", and hereafter designated by that name. The chief characteristic of this "caterpillar" tire being the presence of deep clefts or notches worked in a particular manner into the sides and partially across the tread face (with or without secondary voids of a specific form) for the purpose of increasing traction as well as affording means for relieving the displaced and highly stressed material of the tire within the traction zone—thereby preventing the phenomena of "cupping"; all as explained in the aforesaid Letters Patent.

It is unnecessary to burden this application with a detailed description of the properties and characteristics of the "caterpillar" tire, as the relation of the present invention to the functional improvement of the "caterpillar" will be readily comprehended by those well skilled in the art.

To facilitate the discussion of the present improvements as applied to the "caterpillar" tire, attention is directed to the peculiar manner of partially dividing the tread by radial clefts or notches into a double series of semi-independent traction blocks, which, with the contributing support of the central portion of the tread surface, constitute the weight-supporting portion in road contact. In the following discussion the above identifying terminology will, in general, be adhered to.

In order to appreciate the application of my improvements to the performance of this tire, it is noted that the portion of the tread traversed by a notch and the adjacent edges of the juxtaposed traction blocks, constitute a relatively "soft" non-weight-bearing area; whereas, that portion of the traction block intermediate the notches is relatively "hard", and necessarily supports, in a restricted area, a greater load than that absorbed by the "soft" spot area. This distribution of alternately "soft" and "hard" areas obviously results in a tire structure, which, in rolling, is subjected to stresses of varying intensity, intermittently active, and highly detrimental; not only due to the complexity and intensity of localized stresses, but dynamically adversely affects the smooth rolling properties of the tire with its consequential effect upon the vehicle on which it is mounted.

The actual practical result of the presence of "soft" and "hard" areas—quite aside from the deleterious effect of the consequential varying stresses set up within the structure itself—is a tendency of the tire to run "bumpy". With wide notches, and relatively narrow intact tread surface areas between, the action of the structure would be noticeably rough to an observer riding on the vehicle. With narrower notches, and relatively more extensive intermediate intact tread areas, the tendency to "bump" would still exist in a diminishing degree, but still be actually present and only absorbed by the secondary dampening reaction of mechanical vibration absorbers—such as the customary spring suspension on the vehicle itself.

Being well cognizant of the defect to be overcome, it has become the specific object of this invention to provide sub-tread voids intermediate the notches, so designed that the aforesaid "hard" spots will be practically eliminated and the structure thereby made practically uniformly resilient radially, and also posses unusual circumferential flexibility.

A specific object of the novel formation of the sub-tread voids is to insure that the relieved area will freely respond to deflection under casual and inconsiderably stresses, but will progressively stiffen as deformation increases under an increment of load, thus restricting the ultimate deformation of the tire.

Another object of the sub-tread void is its formation tending to progressively elongate circumferentially of the tire under increasing load, thereby extending the area of resiliency under the aforesaid "hard" spots.

A further object is to so proportion and direct the sub-tread voids that road accretions will not be encountered, and that the internal mass shall become ventilated whereby the heat generated by deformation and working under load will be harmlessly radiated, and whereby during the heat treatment, the vulcanizing temperature shall be conveyed intimately within the central mass.

A still further object is to so proportion and design the sub-tread void that fatigue lines of weakness in the presence of extreme deformation shall be avoided.

And finally, to so combine, relate and coordinate the old features with the new and novel improvements that new functional attributes will be incorporated into the environment structure to a highly beneficial degree.

These, and other objects will hereafter be further illustrated and explained in the accompanying drawings, specifications and claims.

Figure 1:
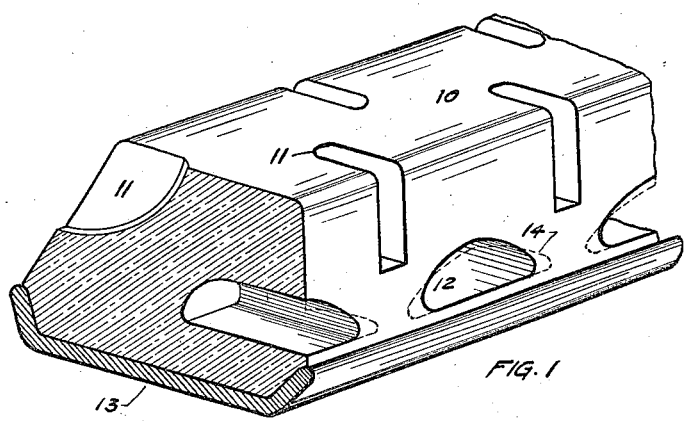
Fig. 1, shows a partial perspective of one form of my invention, the sub-tread void being arched similar to a semi-elliptic spring.
Figure 2:
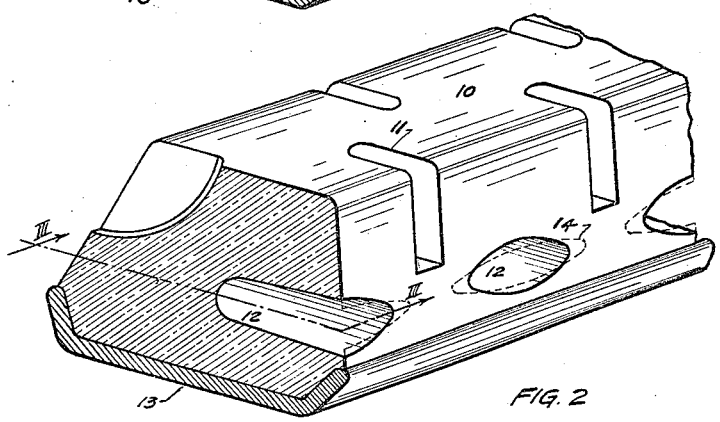
Fig. 2, is similar to Fig. 1, except that the void is fashioned similar to a full-elliptic spring.
Figure 3:
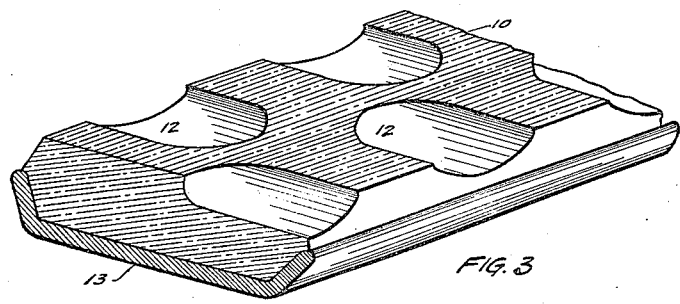
Fig. 3, is a lateral section through the plane III—III of Fig. 2, showing the internal aspect of the sub-tread void.

In the drawings, numeral 10 represents the conventional resilient tire mass having traction notches 11 worked therein sufficiently deep and extensive to materially relieve the traction wave and improving the tractive features. The novel voids 12 are shown of a basic type to accomplish the desideratum claimed, and the usual metallic rim on which this type tire is manufactured is indicated as 13.

Particular attention is invited to the arched form of that portion of the void 12 nearest the tread and directly under the central portion of the tread block, and to the rounded endings of its major axis; for the purpose now explained.

It is obvious that the convex crown of the sub-tread void constitutes the most effective geometrical form for absorbing loads without collapse. It is likewise apparent that the particular shape of this void, lying within a yielding resilient mass, will, in its reaction, simulate the deflection of a well disigned elliptic spring member. This is due to the fact that the displaced rubber does not compress, but flows, and to the further fact that the center of the load falls on the crown of the arch with gradual diminution of its intensity progressing away from that point and toward the major axis limits of the voids, whereby the reaction of the displaced material, when reacting under the controlling influence of the crowned void, will tend to deflect and elongate the void, as shown in dotted lines 14. The facility with which this elongation of the void is effected is accounted for by reason of the comparatively small percentage of the load borne by that part of the structure adjacent the endings of the long dimension of the void; the relief of load stress being due the proximity of the tread notches.

The above defined condition clearly indicating the inevitable and beneficial elongation of the sub-tread voids whereby the area of resiliency is progressively extended under increment of load. Thus, not only imparting new resilient properties to the entire structure, but, at the same time, affording means for absorbing the pent-up flow of the highly stressed tire structure whereby internal stresses are relieved and the resulting heat effectively and harmlessly dissipated.

To insure that there will be ample intact material left within the central mass of the tire to transmit the enormous circumferential torque set up on the driving tires of the vehicle, it is noted that the sub-tread voids do not completely penetrate the tire, and that they are staggered in their opposed relation. In the preferred arrangement they penetrate approximately to the median plane of the structure, with well rounded endings; and, in a direction circumferential of the tire, they are terminated short of the projected radial boundaries of the tread notches. The above arrangement and proportions insure that the interior of the structure will be strong enough to stand up to its work.

It is also apparent that the combination of tread notched and sub-tread voids of the specific design will jointly contribute to the imparting to the structure of an unusual degree of circumferential flexibility. This being a great advantage to a tire in the starting of traction when the engine is suddenly clutched in, for, it frequently happens that enough power is applied to internally rupture a "stiff" tire, or to strip it from its base anchorage. In a tire made as flexible as mine there will be a very considerable yield of the material when traction is sought under heaving driving torque—thereby enabling a gradual absorption of the stress without sudden shock.

In the preferred arrangement of the combined old and new elements of my design, I prefer that the traction notches be staggered, thereby attaining a like relation of the traction blocks and the sub-tread voids with each opposed similar member, respectively. It is likewise preferred that the tire present a trapezoidal cross sectional form with its narrower surface transversely flat and constituting the tread portion.

The above characteristics, and those previously especially referred to, constitute the preferred form, the observance of which, it is believed, would make for the highest efficiency. On the other hand, I do not wish to be limited to the precise disclosure established by drawing and specification; it being apparent that considerable latitude in varying the arrangement and proportions of the several constituent elements can be indulged in without departing from the scope and intent of the appended claims.

I claim:

1. A resilient tire of the class described, comprising: a body portion of trapezoidal cross sectional form irremovably mounted on a metallic base ring and having its narrower parallel face the tread portion; radially disposed traction notches uniformly spaced in staggered relation with opposed notches; and sub-tread voids partially traversing the internal tire mass from each side intermediate the notch positions, said voids being arched toward the tread with a major axis circumferential of the said tire body portion.

2. A resilient tire of the class described, comprising: a body portion of trapezoidal cross sectional form irremovably mounted on a metallic base ring and having its narrower parallel face the tread portion; radially disposed traction notches uniformly spaced in staggered relation with opposed notches; and sub-tread voids partially traversing the internal tire mass from each side intermediate the notch positions, said voids being arched toward the tread with a major axis circumferential of the said tire body portion and said voids being so proportioned that the normal area of resiliency shall be circumferentially extensible under load without fatigue line weakness.

3. A resilient tire of the class described, comprising: a body portion of trapezoidal cross sectional form irremovably mounted on a metallic base ring and having its narrower parallel face the tread portion; radially disposed traction notches uniformly spaced in staggered relation with opposed notches; and sub-tread voids partially traversing the internal mass from each side intermediate the notch positions, said voids being arched toward the tread whereby resistance to deformation is progressively resisted as deformation increases and whereby the circumferential zone of resiliency is increased as the said arch flattens under deforming stress, without developing fatigue line weakness.

4. A resilient tire of the class described, comprising: a body portion of trapezoidal cross sectional form irremovably mounted on a metallic base ring and having its narrower parallel face the tread portion; radially disposed traction notches uniformly spaced in staggered relation with opposed notches; and sub-tread voids partially traversing the internal mass from each side intermediate the notch positions, said voids terminating inwardly adjacent the median plane of the tire body, whereby an imperforate radial division of the structure is maintained in approximately the said median plane from rim to tread.

In testimony whereof I affix my signature.

EDISON G. HULSE.